United States Patent
Yancey

(10) Patent No.: US 7,555,469 B2
(45) Date of Patent: Jun. 30, 2009

(54) RECONFIGURABLE NEURAL NETWORK SYSTEMS AND METHODS UTILIZING FPGAS HAVING PACKET ROUTERS

(75) Inventor: Jerry W. Yancey, Rockwall, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 441 days.

(21) Appl. No.: 11/600,957

(22) Filed: Nov. 16, 2006

(65) Prior Publication Data

US 2008/0120260 A1 May 22, 2008

(51) Int. Cl.
*G06E 3/00* (2006.01)
*G06G 7/00* (2006.01)
*G06N 3/02* (2006.01)

(52) U.S. Cl. .............................. 706/15; 706/18; 706/26
(58) Field of Classification Search .................... 706/15, 706/18, 26; 709/200
See application file for complete search history.

(56) References Cited

U.S. PATENT DOCUMENTS

| | | | | |
|---|---|---|---|---|
| 5,533,169 | A * | 7/1996 | Burnod et al. | 706/41 |
| 5,892,962 | A | 4/1999 | Cloutier | 395/800.16 |
| 6,438,737 | B1 | 8/2002 | Morelli et al. | 716/16 |
| 6,804,201 | B1 * | 10/2004 | Gelenbe | 370/255 |
| 7,082,419 | B1 * | 7/2006 | Lightowler | 706/15 |
| 7,237,091 | B2 | 6/2007 | Huppenthal et al. | 712/34 |
| 2003/0005030 | A1 * | 1/2003 | Sutton et al. | 709/200 |
| 2005/0256969 | A1 | 11/2005 | Yancey et al. | 709/238 |
| 2006/0161882 | A1 * | 7/2006 | Kuo et al. | 717/104 |
| 2006/0228027 | A1 | 10/2006 | Matsugu et al. | 382/181 |
| 2008/0082786 | A1 * | 4/2008 | Lovell | 712/15 |

OTHER PUBLICATIONS

Lawrence A. Hey et al., FPGA Based Router for Cognitive Packet Networks, Dec. 11-15, 2005, 331-332.*
Jocelyn Cloutier et al., "*VIP: An FPGA-based Processor for Image Processing and Neural Networks*," Départment of d'Informatique et de Recherche Opéerationalle, Université de Montréal, AT&T Bell Laboratories (1996).
Jihan Zhu et al., "*FPGA Implementations of Neural Networks—a Survey of a Decade Progress*," School of Information Technology and Electrical Engineering, The University of Queensland, Brisbane, Queensland 4072, Australia (2003).

* cited by examiner

*Primary Examiner*—Joseph P Hirl
(74) *Attorney, Agent, or Firm*—O'Keefe, Egan, Peterman & Enders, LLP

(57) ABSTRACT

Systems and methods are disclosed for forming reconfigurable neural networks with interconnected FPGAs each having a packet router. Neural network nodes are formed within the FPGAs and connections between nodes within an FPGA and connections to nodes external to the FPGA are made using packet routers that are configured within each FPGA. The FPGAs can be connected to each other using high-speed interconnects, such as high-speed serial digital interconnects. The FPGA arrays with packet routing allow for dynamic and reconfigurable neural networks to be formed thereby greatly improving the performance and intelligence of the neural network.

20 Claims, 5 Drawing Sheets

US 7,555,469 B2

RECONFIGURABLE NEURAL NETWORK SYSTEMS AND METHODS UTILIZING FPGAS HAVING PACKET ROUTERS

TECHNICAL FIELD OF THE INVENTION

This invention relates to neural networks and, more particularly, to the interconnection of neural network decision nodes.

BACKGROUND

Field programmable gate array (FPGA) integrated semiconductor devices contain programmable logic components and programmable interconnects. FPGA components can be programmed to duplicate the functionality of basic logic gates, or more complex functions. Typically, FPGAs also include memory elements. Current FPGAs are slower than their application-specific integrated circuit (ASIC) counterparts, cannot handle as complex a design, and draw more power. However, FPGAs have a shorter time to market, can be reprogrammed in the field, and have lower non-recurring engineering costs.

Traditionally, the term "neural network" refers to a network of biological neurons. As used herein, "neural network", also referred to as an "artificial neural network," is a computing paradigm loosely modeled after cortical structures of the brain, and includes interconnected processing elements or neurons. These neurons work together to produce an output function that relies on the cooperation of individual neurons within the network in order to operate. However, a neural network can still perform its overall function if some of the neurons are not functioning.

Current neural networks are constructed in fixed arrays of neural elements or neurons with a limited ability to distribute weight values among the neurons. The architecture of the network is selected with a particular problem in mind, because different configurations are used to work different kinds of problems. While one of these configurations may be able to learn to solve a particular problem, it will not be as useful for other tasks. Also, with traditional neural network configurations, there is typically no way to quickly introduce alternate weight sets optimized for other problems, change the neuron interconnections, and/or save intermediate outputs within the current neural networks. Therefore, the usefulness of current neural network systems is limited.

SUMMARY OF THE INVENTION

Systems and methods are disclosed for reconfigurable neural networks that utilize interconnected FPGAs. Each FPGA has a packet router that provides communication connections to neural network nodes internal to the FPGA and neural network nodes in other external FPGAs. In this configuration, a control module in one FPGA can be configured to act as a neural network controller to provide control of neuron interconnections, weight values, and other control data to the other network nodes in order to control the operation of the neural network as a whole. In addition, the FPGAs can be connected to each other using high-speed interconnects, such as high-speed serial digital connections. By utilizing packet routing and high speed interconnects, a highly reconfigurable and advantageous neural network can be formed that allows for rapid reconfiguration and dynamic operation in the tasks the neural network is programmed to perform. In this way, more intelligent and dynamic operation of a neural network can be achieved than was previously possible. As described below, various embodiments and features can be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for forming neural networks using FPGAs (field programmable gate array) and packet routing. The neural networks are highly reconfigurable in that neural network nodes communicate to each other using dynamic packet routing rather then fixed node interconnections. As discussed herein, implementing a neural network using FPGAs and packet routing allows for an advantageous, highly reconfigurable neural network.

Figure 1:
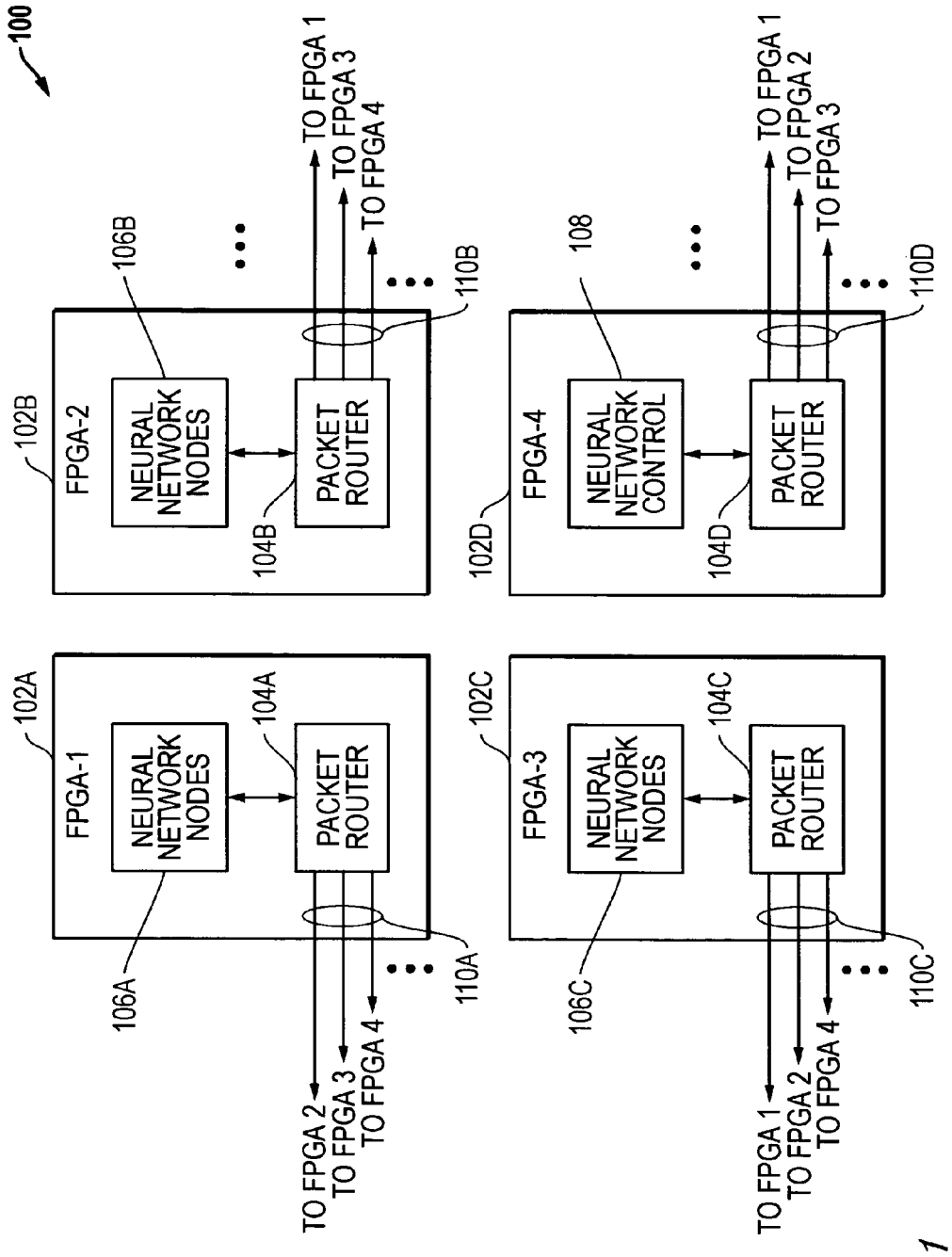
FIG. 1 is a block diagram of a neural network system using FPGAs having packet routers.

FIG. 1 shows a diagram of an FPGA array connected to form a neural network 100. A plurality of FPGAs 102A (FPGA-1), 102B (FPGA-2), 102C (FPGA-3), 102D (FPGA-4), . . . are interconnected using direct connections 110A, 110B, 110C, 110D, . . . , such as high-speed serial connections. It is noted that any number of FPGAs could be interconnected to form an FPGA array in implementing a neural network as disclosed herein. As depicted, each FPGA has a connection to each other FPGA. For example, FPGA 102A (FPGA-1) includes connections 110A providing for a direct connection to FPGAs 102B (FPGA-2), 102C (FPGA-3), 102D (FPGA-4) and any other FPGA included in the neural network. FPGA 102B (FPGA-2) includes connections 110B providing for a direct connection to FPGAs 102A (FPGA-1), 102C (FPGA-3), 102D (FPGA-4) and any other FPGA included in the neural network. FPGA 102C (FPGA-3) includes connections 110C providing for a direct connection to FPGAs 102A (FPGA-1), 102B (FPGA-2), 102D (FPGA-4) and any other FPGA included in the neural network. And FPGA 102D (FPGA-4) includes connections 110D providing for a direct connection to FPGAs 102A (FPGA-1), 102B (FPGA-2), 102C (FPGA-3) and any other FPGA included in the neural network.

The FPGAs 102A (FPGA-1), 102B (FPGA-2), 102C (FPGA-3), 102D (FPGA-4), . . . are also configured and programmed to provide neural network nodes. In addition, one or more of the FPGAs can also be configured to provide management and control functions for the neural network. As depicted, FPGAs 102A (FPGA-1), 102B (FPGA-2) and 102C (FPGA-3) have been programmed to provide neural network nodes 106A, 106B and 106C, respectively. And FPGA 102D (FPGA-4) has been programmed to provide neural network control 108. In this configuration, therefore, a control module in FPGA 102D (FPGA-4) is configured to act as a neural network controller to provide control of neuron (network node) interconnections, weight values, and other control data to the other network nodes in order to control the operation of the neural network as a whole. The neural network 100 is formed by the internal neural nodes and control functions formed within the array of FPGAs. Connections between neural network nodes are made using data packets processed by the packet routers 104A, 104B, 104C and 104D within the FPGAs 102A, 102B, 102C and 102D. The packet routers provide an internal communication mechanism for neural network nodes within a given FPGA and provide a communication mechanism among the FPGAs where neural network nodes connect to nodes in other FPGAs.

It is noted that FPGAs with packet routing and high-speed interconnects are disclosed with respect to U.S. patent application Ser. No. 10/843,226, entitled SYSTEMS AND METHODS FOR INTERCONNECTION OF MULTIPLE FPGA DEVICES, and published as U.S. Published patent application No. 2005/0256969, which is hereby incorporated by reference in its entirety. This published and currently pending application is assigned to the same assignee as the current application. In addition, packet routing and high-speed interconnects are also disclosed with respect to U.S. patent application Ser. No. 11/600,934 entitled "Reconfigurable Communications Infrastructure for ASIC Networks" by Yancey, et al., which was concurrently filed with the present application, which is hereby incorporated by reference in its entirety. This concurrently filed application is assigned to the same assignee as the current application.

Figure 2:
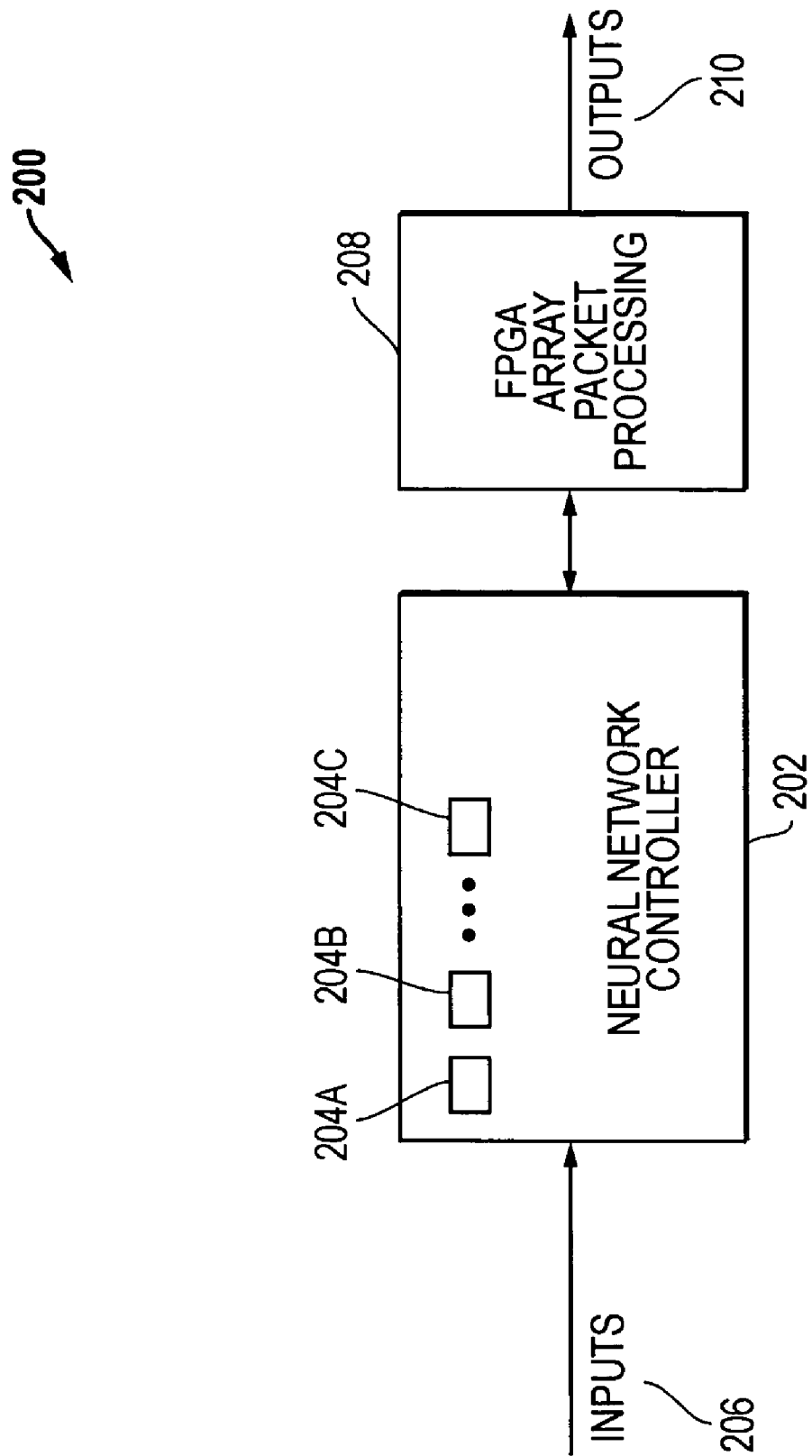
FIG. 2 is a block diagram of a neural network system operating with FPGAs.

FIG. 2 shows a conceptual diagram of a reconfigurable neural network 200. A neural network controller 202 is coupled to an FPGA neural network array 208 and is configured to provide input, management and control data to the FPGAs within the FPGA array 208. As depicted, the controller 202 includes a plurality of different tasks 204A, 204B . . . 204C the neural network could be asked to perform. The controller 202 selects the control data or task that is to be implemented by the neural network and provides the task 204A, 204B . . . or 204C and input data 206 to the FPGA neural network array 208. The neural network array 208 is then configured to perform the selected task and operates on the inputs 206 according to the selected task. Outputs 210 are subsequently produced. Data packets are processed through packet routers in selected FPGAs to reconfigure the neural network based upon definitions in the data packets. Tasks 204 are dynamically set up, and physical connections remain in place within the neural network. The controller 202 decides which tasks 204 to run and the amount of processing power used for each task 204. By using the FPGA array 208 as the neural network, the neural network can be reconfigured so that a wide variety of tasks can be performed by the neural network.

It is noted that the controller 202 in FIG. 2 can correspond to a portion of one or more FPGAs programmed to perform the function of the neural network controller, such as neural network control 108 within FPGA 102D (FPGA-4) in FIG. 1. It is further noted that the FPGA array neural network 208 can be a portion of interconnected FPGAs programmed to provide neural network nodes, such as neural network nodes 106A, 106B and 106C in FIG. 1.

Figure 3:
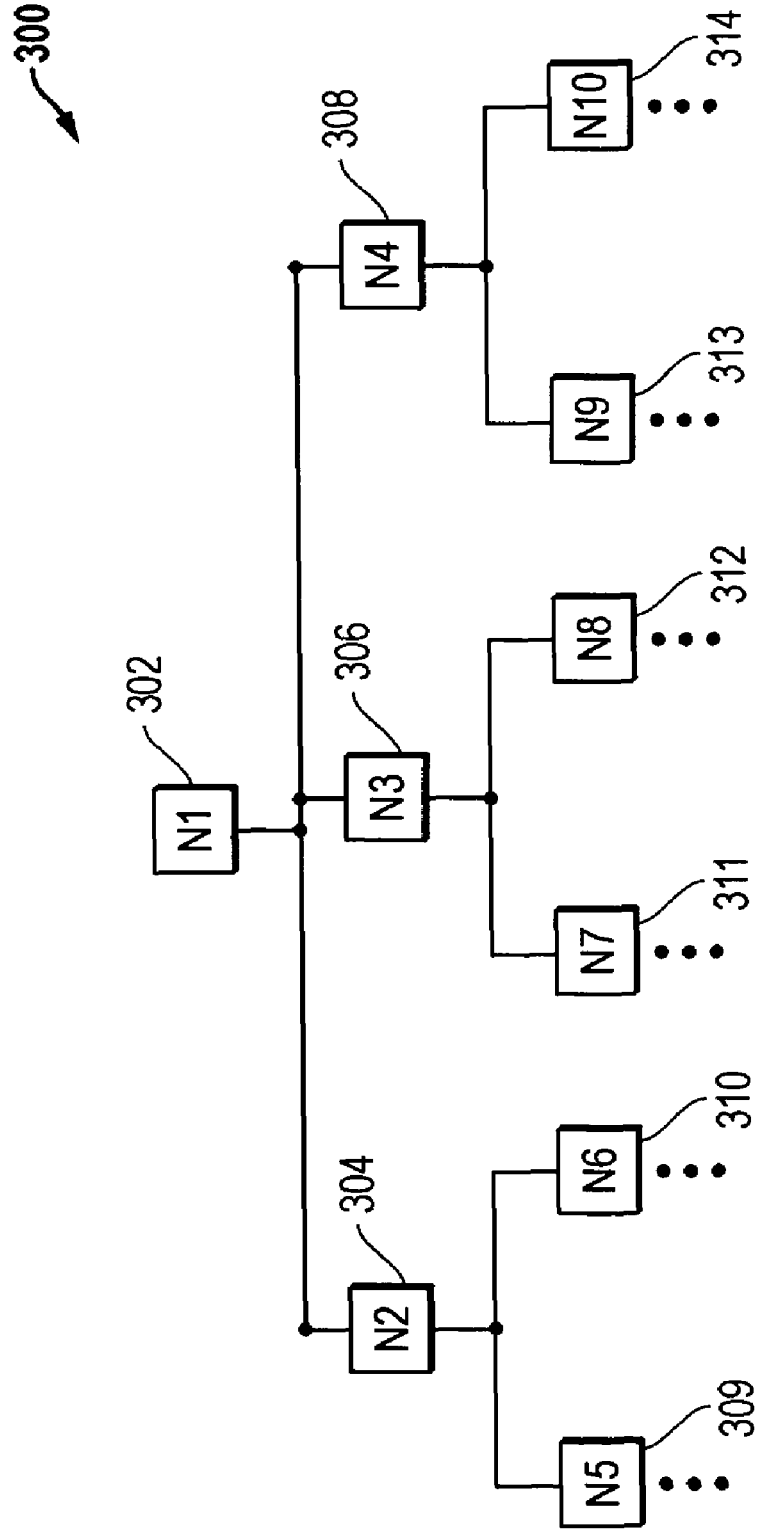
FIG. 3 (prior art) is a fixed node hierarchy for prior neural network elements.

FIG. 3 (prior art) shows a diagram of a fixed neural node hierarchy 300 of a prior art system where neural elements are connected in a fixed manner. Node 302 (N1) is the first neural element and branches to a second tier of the fixed array structure, including nodes 304 (N2), 306 (N3), and 308 (N4). Nodes 304 (N2), 306 (N3), and 308 (N4) then each branch to a third tier of the fixed array structure. As depicted, node 304 (N2) branches to node 309 (N5) and node 310 (N6), and so on. Node 306 (N3) branches to node 311 (N7) and node 312 (N8), and so on. Node 308 (N4) branches to node 313 (N9) and node 314 (N10), and so on. It is noted that more or less than three tiers can be present in the prior art fixed array structure, and the fixed interconnections can be done as desired depending upon the task to be performed by the neural network. Once trained, each of the nodes in hierarchy 300 will have a decision and a weighting to provide to that decision. Unfortunately, once trained for a particular task, the weightings will tend to remain fixed.

With respect to the neural network of FIG. 3 (prior art), therefore, a limited ability exists to distribute weight values among the neurons and the neuron interconnections become fixed. The interconnections for the nodes in this prior art neural network are selected with a particular problem in mind because different configurations are typically used to work different kinds of problems. In addition, the weightings for the nodes are typically based upon training of the neural network and are difficult to change. Thus, while a prior art neural network configuration may be able to "learn" to solve a particular problem, it will not be as useful for other tasks. Further, there is no way to quickly introduce alternate weight sets optimized for other problems, change the neuron interconnections, or save immediate outputs. The prior art neural networks use dedicated interconnections with pre-defined arrangements of neurons. Therefore, the usefulness of the prior art neural network is limited.

Figure 4:
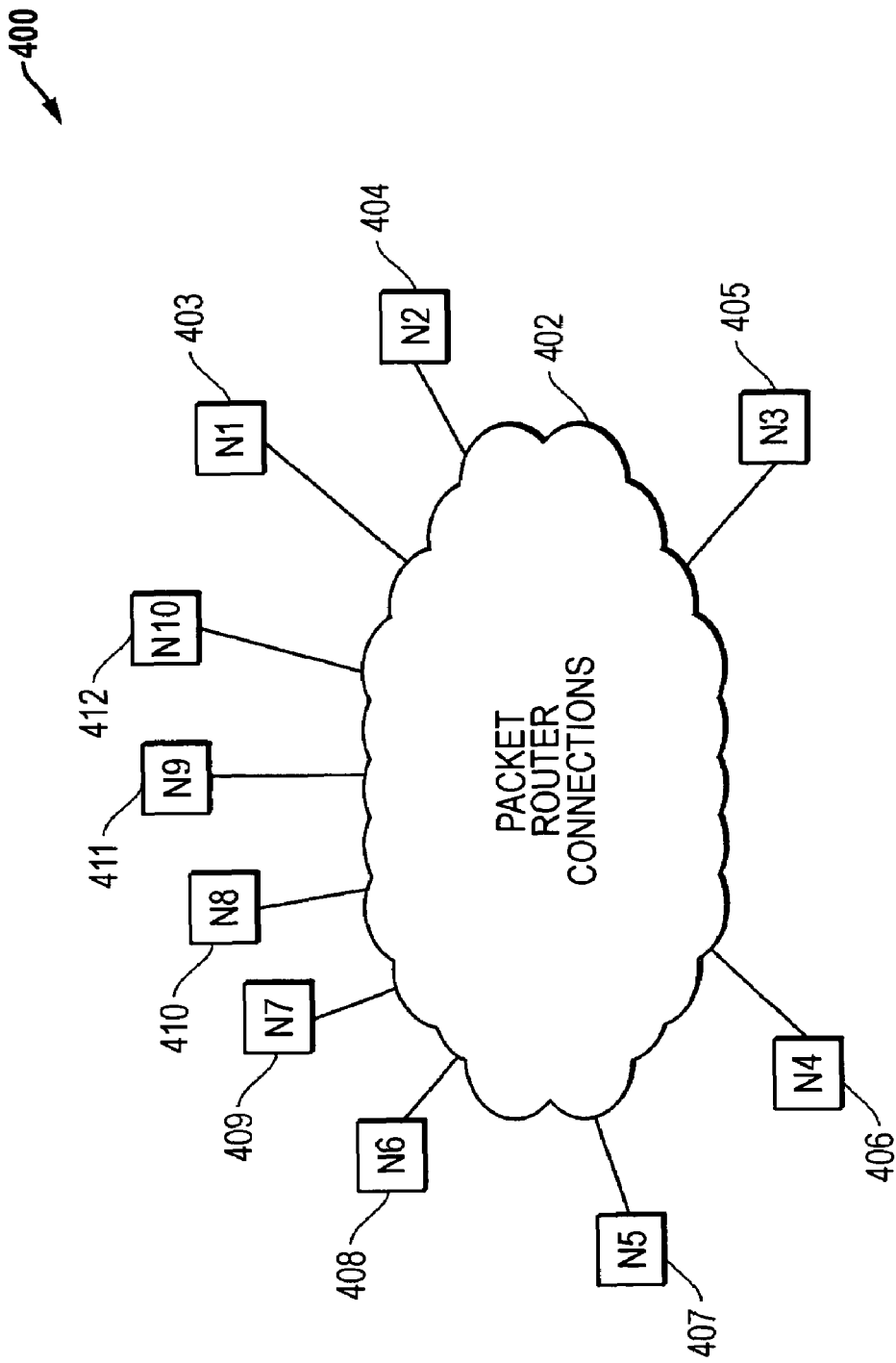
FIG. 4 is a diagram of a neural network system having dynamic interconnections of neurons provided by using FPGAs with packet routers.

FIG. 4 shows a diagram of a neural network system 400 with dynamic interconnections of neurons based upon packet routing. The cloud 402 represents packet router connections between the neural network node elements. In particular, each of the neural network nodes 403 (N1), 404 (N2), 405 (N3), 406 (N4), 407 (N5), 408 (N6), 409 (N7), 410 (N8), 411 (N9) and 412 (N10), and so on. The neurons or nodes simultaneously operate in one machine using rapid successive replacement of network configurations as instruction states in the neural network. The neural network of FIG. 4 has internal interconnections and programming accomplished via a dedicated high-speed network with packet routing that allows dynamic interconnections between nodes. This packet routing, therefore, allows a signal neural network to be reconfigured easily so that multiple neural network configurations can be used to solve a given problem or a series of problems.

It is noted that the neural network nodes in FIG. 4 may be configured within any desired FPGA within the array of FPGAs. For example, looking to FIG. 1, the FPGA 102A (FPGA-1) could include some, all or none of the neural network nodes 403 (N1), 404 (N2), 405 (N3), 406 (N4), 407 (N5), 408 (N6), 409 (N7), 410 (N8), 411 (N9) and 412 (N10). This is also the case for the other FPGAs 102B, 102C and 102D. The packet routers 104A, 104B, 104C and 104D for these FPGAs will route the data packets to the appropriate nodes or set of nodes so that the desired connection is made between nodes. In this way, the neural connections are very dynamic and reconfigurable. As speeds within FPGAs and between FPGAs increase, the ability of an array of FPGAs with packet routing to provide a neural network can also increase to provide an increasing level of intelligence for the neural network.

It is further noted that the FPGA array can form multiple different neural networks to simultaneous work to solve different problems. In addition, each neuron configured within an FPGA could be part of one or more of those different neural networks. As such, neural network nodes 403 (N1), 404 (N2), 405 (N3), 406 (N4), 407 (N5), 408 (N6), 409 (N7), 410 (N8), 411 (N9) and 412 (N10) represented in FIG. 4 can each be utilized by one or more different neural networks For example, for neural network based character recognition, the FPGA array could be configured to analyze objects on a scanned page to determine what alpha-numeric characters they represent. A different neural network could be formed within the FPGA array for each number and letter of the alphabet. These neural network processes could operate simultaneously, and certain nodes could be used by more than one of the neural networks. Because certain letters and numbers have common strokes, there could be an advantage in using the same nodes in different neural networks.

Figure 5:
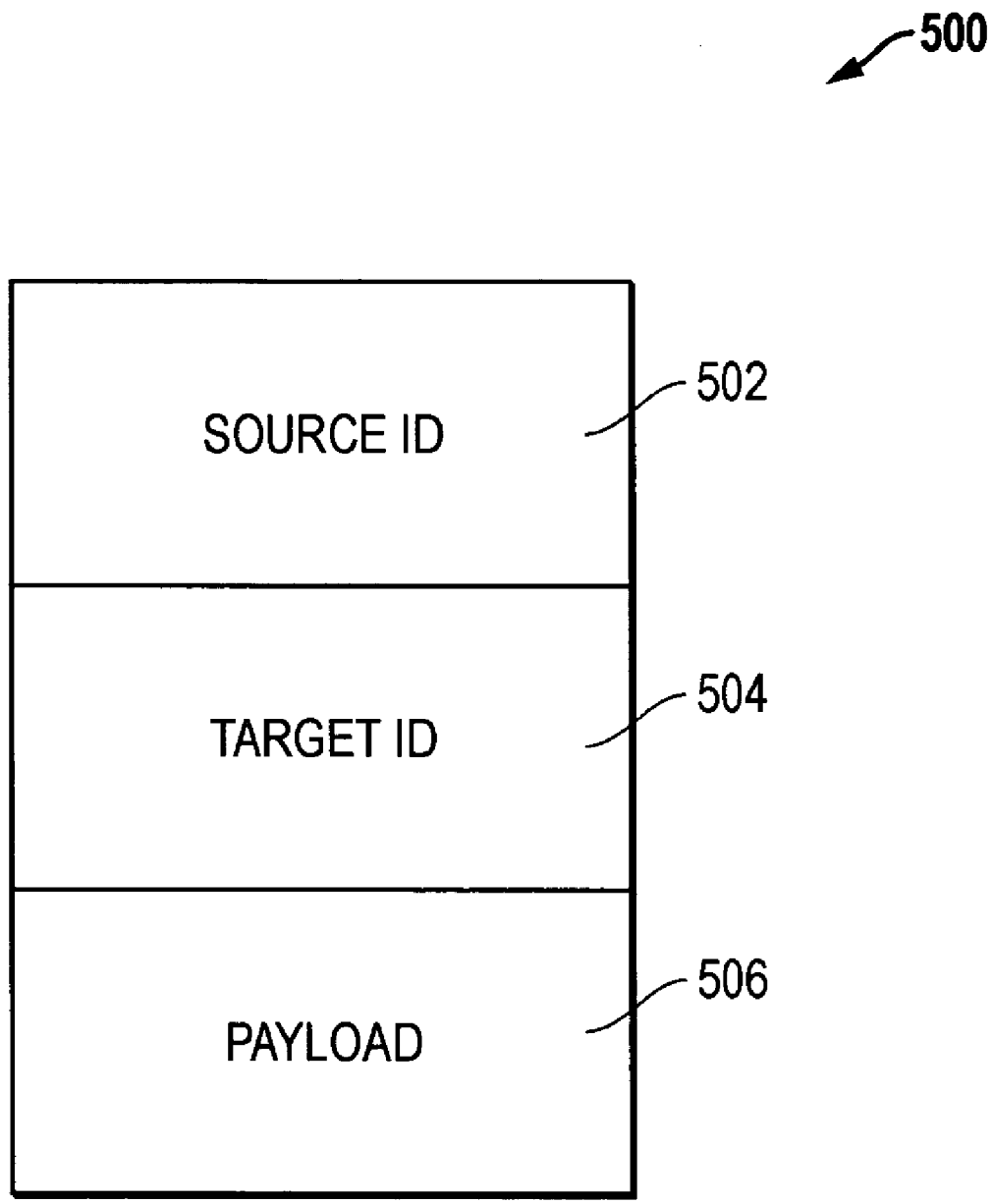
FIG. 5 is a diagram of how information output from each neuron is packetized and fed into the packet routers for communication within the neural network.

FIG. 5 shows a simple diagram of a data packet that could be used as an output from each neuron and fed into the packet routers. Depending on the desired neural network configuration, packets could be broadcast to all other nodes, could be directed to a subset of other nodes or could be sent to a single node. The data packets could be formed, as desired. The data packet 500 in FIG. 5 is simply meant as an example. As depicted, data packet 500 includes a source identification (ID) field 502, and a target ID 504 field and a payload field 506. The source ID 502 represents the source node for the data packet. The target ID 504 represents the target node for the data packet. The payload field 506 represents the command, control, data, etc. that represents the information to be transferred in the packet to the destination node, for example. as part of the task being implemented by the neural network.

In operation, target neurons process the packets they are interested in, applying the constraints of a pre-programmed network configuration and weight set. Network timing could also be controlled using the data packets. The packet routing techniques described herein allow unrestricted and dynamic inter-neuron branching. A communications pathway is thereby provided to allow alternate network configurations and weight sets to be distributed to the network and quickly put into place through packet routing and FPGA configuration. Different neural network configurations can be created and executed in the same FPGA neural network machine in sequential rapid-fire fashion. Neurons could also participate in multiple FPGA neural networks simultaneously. Using the techniques described herein, neural networks with fewer neurons can solve more complex problems.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A reconfigurable neural network system, comprising:
   a plurality of interconnected FPGAs (field programmable gate arrays) forming an FPGA array, each FPGA including a packet router and forming a plurality of internal neural network nodes; and
   a neural network controller coupled to the interconnected FPGAs and providing input and control data to the FPGAs;
   wherein connections between neural network nodes are made utilizing data packets processed by the packet routers within the FPGAs.

2. The reconfigurable neural network system of claim 1, wherein connections between FPGAs are made comprising direct high-speed interconnects.

3. The reconfigurable neural network system of claim 1, wherein the neural network controller is configured within one of the FPGAs.

4. The reconfigurable neural network system of claim 3, wherein the neural network controller is implementing a plurality of tasks.

5. The reconfigurable neural network system of claim 4, wherein the neural network controller is making dynamic changes to the neural network node connections.

6. The reconfigurable neural network system of claim 4, wherein the neural network controller is determining which tasks to run.

7. The reconfigurable neural network system of claim 6, wherein the neural network controller is allocating an amount of the neural network nodes within the FPGA array to each task.

8. The reconfigurable neural network system of claim 1, wherein the FPGA array is forming a plurality of different neural networks and wherein the neural network controller is managing the plurality of neural networks formed within the FPGA array.

9. The reconfigurable neural network system of claim 8, wherein one or more neural network nodes are utilized by more than one neural networks.

10. The reconfigurable neural network system of claim 1, wherein the data packets comprise source identification information, destination identification information and payload information, wherein the payload represents information related to a task being performed by the neural network.

11. A method for forming a reconfigurable neural network, comprising:
   interconnecting a plurality of FPGAs (field programmable gate arrays) to form an FPGA array;
   communicating among the FPGAs utilizing packet routers configured as part of each FPGA;
   forming a plurality of neural network nodes within the plurality of FPGAs;
   utilizing the neural network nodes to form one or more neural networks within the FPGA array; and
   dynamically connecting neural network nodes utilizing data packets processed by the packet routers within the FPGAs.

12. The method of claim 11, wherein the interconnecting step comprises interconnecting the FPGAs with direct high-speed interconnects.

13. The method of claim 11, further comprising configuring one FPGA to include a neural network controller managing operations of the neural network.

14. The method of claim 13, further comprising implementing a plurality of tasks for the one or more neural networks and utilizing the neural network controller to manage the tasks.

15. The method of claim 14, further comprising making dynamic changes to the neural network node connections during performance of a task for the neural network.

16. The method of claim 14, further comprising the neural network controller determining which tasks to run.

17. The method of claim 16, further comprising selecting a portion of the neural network nodes within the FPGA array to allocate to each task.

18. The method of claim 11, further comprising forming a plurality of different neural networks, each neural network being performing a different task.

19. The method of claim 18, further comprising utilizing one or more neural network nodes in a plurality of neural networks.

20. The method of claim 11, further comprising communicating using data packets that comprise source identification information, destination identification information and payload information, wherein the payload represents information related to a task being performed by the neural network.

\* \* \* \* \*